Nov. 1, 1955   J. K. MUSE   2,722,201
ROTARY INTERNAL COMBUSTION ENGINE
Filed Aug. 14, 1953   4 Sheets-Sheet 1

INVENTOR.
JOHN K. MUSE
BY

McMorrow, Berman & Davidson
ATTORNEYS

INVENTOR.
JOHN K. MUSE

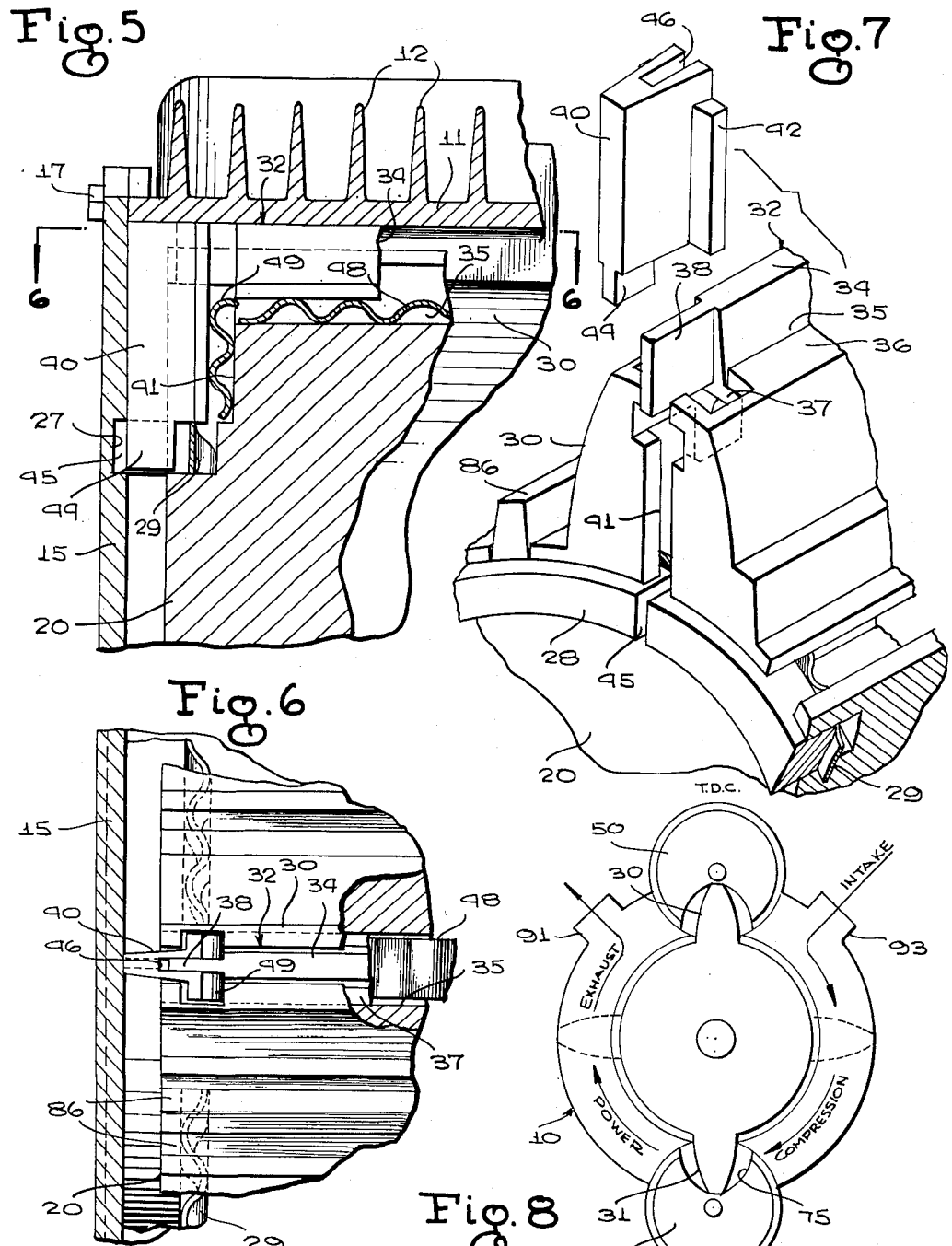

United States Patent Office 2,722,201
Patented Nov. 1, 1955

2,722,201

ROTARY INTERNAL COMBUSTION ENGINE

John K. Muse, Daytona Beach, Fla.

Application August 14, 1953, Serial No. 374,321

5 Claims. (Cl. 123—13)

This invention relates to rotary internal combustion engines and more particularly to rotary internal combustion engines of the type having a fixed housing providing an annular chamber, a rotor centered within the housing, pistons carried by the rotor and movable around the annular chamber, rotary valves mounted in the housing and driven by the rotor and means for injecting fuel into the annular chamber and burning the fuel therein.

It is among the objects of the invention to provide an improved rotary combustion engine of the character indicated above, wherein special sealing means are included to effectively seal the rotor and pistons to the annular housing and rotary valves; wherein each rotor carried piston provides a power stroke during each rotation of the rotor; wherein the combustion air for each power stroke is initially compressed into an ignition chamber of restricted dimensions to a fuel igniting temperature and fuel is injected into the ignition chamber and ignited before the charge enters the annular chamber to react against the corresponding piston during the power stroke thereof; wherein additional fuel may be injected into the combustion charge in the annular chamber, if desired; wherein one of the rotary valves separates the compression strokes of the pistons from the power strokes of the pistons and seals the compressed air in the ignition chamber as the piston passes this valve, later releasing each combustion charge into the annular chamber between the valve and the corresponding piston, and the other rotary valve serves as a separator between the exhaust and intake strokes of the pistons; wherein a plurality of annular chambers and associated rotors may be provided in side by side relationship and all of the rotors may drive a common rotor shaft; and which engine is simple and durable in construction, economical to manufacture, easy to assemble and disassemble, efficient and effective in operation, and has a high ratio of horsepower output to its weight.

Other objects and advantages will become apparent from a consideration of the following description and the appended claims in conjunction with the accompanying drawings, wherein:

Figure 5 is a fragmentary cross sectional view on an enlarged scale on the line 5—5 of Figure 4;

Figure 6 is a fragmentary cross sectional view on the line 6—6 of Figure 5;

Figure 7 is an exploded perspective view of a fragmentary portion of the interior of the engine;

Figure 8 is a diagrammatic illustration showing the engine cycles; and

Figure 1:
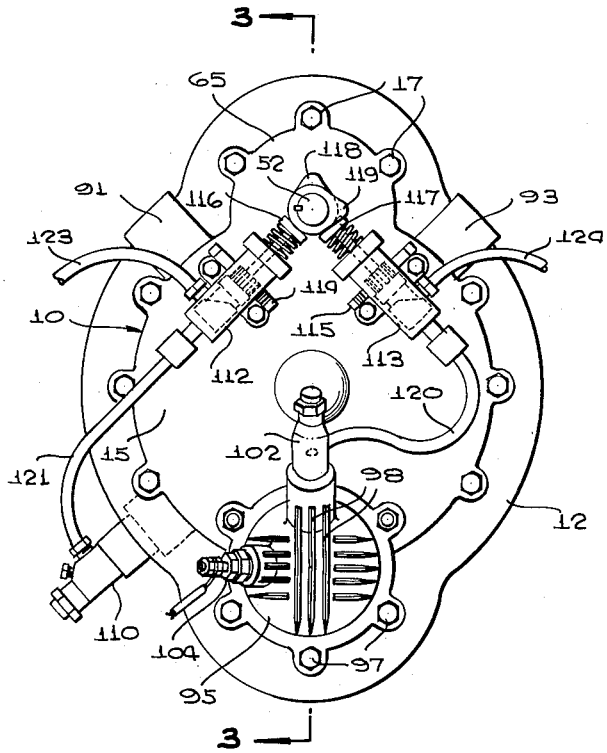
Figure 1 is an end elevational view of a rotary internal combustion engine constructed in accordance with the invention.
Figure 2:
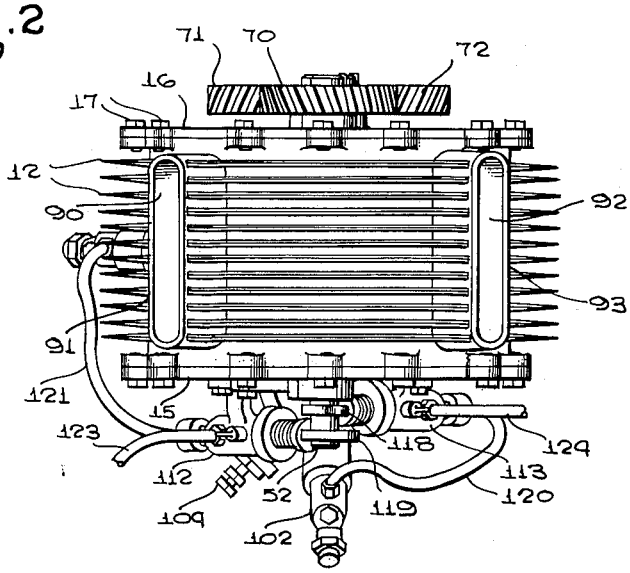
Figure 2 is a top plan view of the engine.
Figure 3:
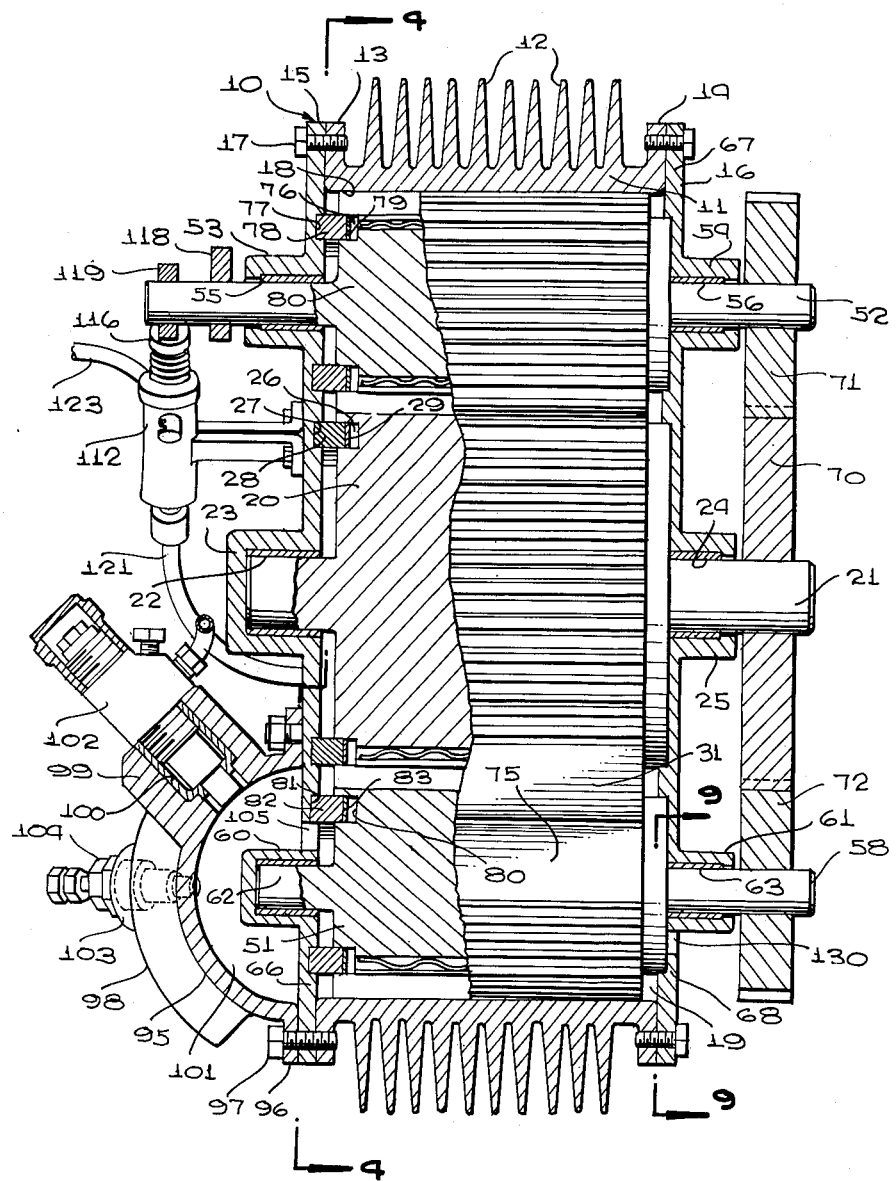
Figure 3 is a cross sectional view on the line 3—3 of Figure 1.
Figure 4:
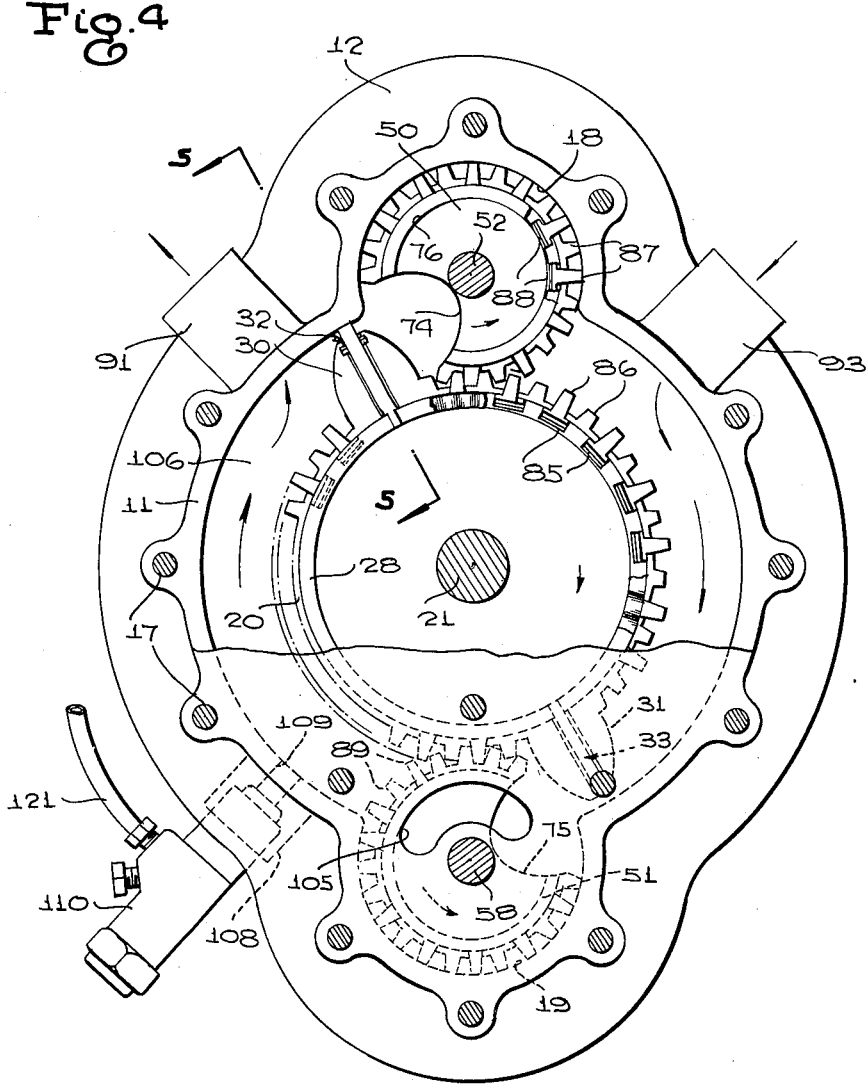
Figure 4 is a cross sectional view on the line 4—4 of Figure 3.
Figure 9:
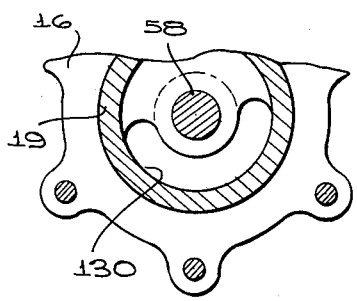
Figure 9 is a fragmentary cross sectional view on the line 9—9 of Figure 3.

With continued reference to the drawings, the engine comprises a fixed outer housing, generally indicated at 10, and including a side wall 11 of generally cylindrical shape surrounded by integral cooling fins 12 and provided at its ends with outwardly directed apertured flanges 13 and 14 and flat end plates 15 and 16 disposed in spaced apart and parallel relationship to each other and in closing relationship to the respectively opposite ends of the housing and secured to the housing flanges 13 and 14 by bolts 17 extending through registering apertures in the end walls marginally thereof and in the flanges 13 and 14 of the annular wall of the housing.

The housing 10 provides therein an annular chamber and the annular wall 11 of the housing is extended outwardly at diametrically opposite locations therearound to provide therein valve chambers 18 and 19 of partly cylindrical shape opening into the annular chamber provided within the housing around the inner surface of the housing annular wall 11.

A rotor 20 of cylindrical shape is disposed within the housing 10 between the end walls 15 and 16 and is centered relative to the housing. A rotor shaft 21 extends through the rotor 20 with its center lines disposed axially of the rotor and projects at its ends outwardly of the corresponding ends of the rotor. One end of the shaft 21 is journaled in a bearing 22 mounted in a bearing receptacle formation 23 projecting outwardly from the housing end wall 15 centrally thereof, and the other end of the shaft 21 extends through and is journaled in a bearing 24 mounted in a bearing receptacle formation 25 extending outwardly of the end wall 16 centrally of this end wall.

The rotor 20 is provided in each end thereof with circular grooves, as indicated at 26, extending around the ends of the rotor concentrically of the rotor shaft 21 and near the peripheral surface of the rotor and the end walls 15 and 16 are provided in their inner surfaces with grooves, as indicated at 27, respectively registering with the corresponding grooves 26 in the ends of the rotor. Sealing rings, as indicated at 28, are disposed at the respectively opposite ends of the rotor and partly received in the corresponding end wall grooves and the corresponding rotor grooves to provide a fluidtight seal between the rotor and the end walls of the housing adjacent the peripheral surface of the rotor. The rings 28 are preferably formed each in two sections of semicircular shape and are of rectangular cross sectional shape and corrugated thrust springs 29 are disposed, one in each rotor groove to force the corresponding rings 28 outwardly of the rotor grooves and into the end wall grooves to seal the rotor to the housing end walls.

The rotor 20 has a diameter materially less than the internal diameter of the annular wall 11 of the engine housing, and pistons 30 and 31 extend outwardly from the peripheral surface of the rotor at diametrically opposite locations around the rotor substantially to the inner surface of the annular wall 11. The pistons 30 and 31 are of rectangular cross sectional shape in a direction along the center line of the rotor shaft 21, but are of substantially gear tooth shape in planes perpendicular to the center line of the rotor shaft, and each piston is provided with a continuous groove having a portion extending along the surface of the piston adjacent the inner surface of the annular wall 11 of the engine housing and portions extending, one along each end of the piston radially of the rotor 20.

Sealing means, as generally indicated at 32 and 33, are disposed in the grooves of the pistons 30 and 31 respectively, for sealing the pistons to the inner surface of the annular wall 11 of the housing and to the inner surfaces of the end walls 15 and 16 of the housing between the sealing rings 28 and the inner surface of the annular wall 11.

Each of the sealing members 32 and 33, as is particularly illustrated in the case of the sealing member 32 in Figure 7, comprises a sealing bar 34 of somewhat rectangular shape extending along and partly received in the groove 35 provided in the tip surface 36 of the piston 30. The groove 35 is T-shaped in cross section, and the bar 34 is provided along its edge received in the groove 35 with outwardly extending flanges, one of which is illustrated in Figure 7 and designated at 37, which flanges extend into the end portions of the cross part of the T-shaped slot while the bar 34 extends through the stem portion of the T-shaped slot and outwardly of the tip surface 36 of the piston. The sides of the bar 34 converge at a slight angle from the flanged edge of the bar to the outer edge thereof which engages the inner surface of the annular wall 11 and the end portions of the bar are reduced in thickness and provided with parallel side faces, one such end portion being illustrated in Figure 7 and designated at 38.

End sealing bars, one of which is illustrated in Figure 7 and designated at 40, are secured one in each end slot of the piston and are of the same cross sectional shape as the bar 34, described above. The end slots, as indicated at 41, are of T cross sectional shape, and the end bars 40 are provided along their edges disposed within the corresponding end slots with outwardly and oppositely-extending flanges, as indicated at 42, received in the ends of the cross portion of the corresponding T-shaped end slot, while the bar extends outwardly through the stem portion of the corresponding slot.

Each end bar 40 extends to the outer edge of the corresponding sealing bar 34 and has at its inner end an extension 44 of reduced diameter received in a notch or discontinuity 45 in the corresponding sealing ring 28 and is provided in its outer end with a notch or recess 46 of rectangular shape which receives the reduced end portion 38 on the corresponding end of the bar 34.

The crossbar 34 and the two end bars 40 associated with each of the pistons 30 and 31 constitute a seal extending around the corresponding pistons and sealing the pistons to the inner surface of the annular wall 11 of the housing and to the inner surfaces of the end walls 15 and 16 of the housing, between the corresponding sealing rings 28 and the inner surface of the annular wall 11.

A corrugated thrust spring 48 is disposed between the inner edge of the bar 34 and the bottom surface of the groove 35 receiving this bar and resiliently forces the outer edge of the sealing bar 34 into sliding engagement with the inner surface of the annular wall 11 and corrugated thrust springs, as indicated at 49, are disposed one between the inner edge of each of the end bars 40 and the bottom surfaces of the end grooves 41, to resiliently force the outer edges of the end bars 40 against the inner surfaces of the end walls 15 and 16 of the housing.

Rotary valves 50 and 51 of cylindrical shape are disposed in the partly cylindrical recesses 18 and 19 in the annular wall 11 and extend from the inner surface of one of the end walls to the inner surface of the outer end wall of the housing. The valve 50 is mounted on a shaft 52 which extends through the valve 50 with its center line disposed coaxially of the cylindrical valve, and this shaft extends outwardly through bearing receptacle formations 53 and 54 provided on and extending outwardly of the end walls 15 and 16 respectively, and is journaled in bearings 55 and 56 mounted respectively in the receptacle formations 53 and 54. The valve 51 is mounted on a shaft 58, one end of which extends into a closed bearing receptacle formation 60 mounted on and extending outwardly from the end wall 15 and through a bearing receptacle formation 61 mounted on and extending outwardly of the end wall 16, the shaft 58 being journaled in bearings 62 and 63 mounted in the receptacles 60 and 61 respectively.

While the bearings 22, 24, 55, 56, 62 and 63 have been illustrated as plain bearing bushings for the sake of simplicity in the illustration, it is to be understood that some or all of these bearings may be antifriction ball or roller bearings, if desired.

It will be noted that the end wall 15 is provided with partly circular extensions 65 and 66 covering the ends of the valve recesses 18 and 19 and carrying the bearing receptacle formations 53 and 60 and that the end wall 16 is provided with similar partly circular extensions 67 and 68 which cover the corresponding ends of the valve recesses and carry the bearing receptacle formations 54 and 61.

A gear 70 is mounted on the rotor shaft 21 outwardly of the outer end of the bearing receptacle 25, and gears 71 and 72 are mounted on the valve shafts 52 and 58 outwardly of the bearing receptacle formations 54 and 61 respectively, and mesh with the gear 70, so that both of the valves 50 and 51 are driven by the rotor shaft 21 in timed relationship to the rotation of the rotor.

The valve 52 is provided with a longitudinally extending recess 74 of substantially the same cross sectional shape as the cross sectional shape of the pistons 30 and 31, but wider than the thickness of the pistons, and the valve 51 is provided with a longitudinally extending recess 75 similar to the recess 74 in the valve 50, the pistons 30 and 31 passing through the recesses 74 and 75 as they pass the valves 50 and 51 during the rotation of the rotor 20 and the valves.

The valve 50 is provided, in each end thereof, with grooves, as indicated at 76, extending around the peripheral surface of the valve between the opposite sides of the recess 74, and the end walls 15 and 16 are provided in their inner surfaces with grooves, as indicated at 77, registering with the grooves in the opposite ends of the valve. Sealing rings 78 of partly circular longitudinal shape and rectangular cross sectional shape are disposed one in each groove in the valve and extend into the corresponding grooves in the housing end walls 15 and 16, corrugated thrust springs, as indicated at 79, being disposed between the sealing rings 78 and the bottoms of the corresponding grooves in the ends of the valve 50 to resiliently press the sealing rings into the corresponding grooves in the housing end walls.

The valve 51 is provided in its ends with grooves, as indicated at 80, corresponding to the grooves in the ends of the valve 50, and extending around the peripheral surface of the valve 51 between the opposite sides of the recess 75 and the housing end walls are provided in their inner surfaces with grooves, as indicated at 81, registering with corresponding grooves in the ends of the valve 51. Sealing rings, as indicated at 82, of partly circular longitudinal shape and rectangular cross sectional shape are disposed, one in each of the grooves 80 in the valve 51, and extend into the corresponding grooves in the housing end walls, and corrugated thrust springs, as indicated at 83, are disposed, one between each of the packing or sealing rings 82, and the bottoms of the corresponding grooves 80.

The packing rings 78 and 82 provide a fluid seal between the ends of the valves 50 and 51 and the corresponding inner surfaces of the housing side walls 15 and 16, so that fluid under pressure will not leak between the ends of the valves and the inner surfaces of the side walls.

The rotor 20 is provided in its peripheral surface with T-shaped grooves 85 extending longitudinally of the rotor at locations angularly spaced apart therearound, and sealing bars 86, corresponding in cross sectional shape to the bar 34 illustrated in Figure 7 and described above, are mounted, one in each of the grooves 85 and extend longitudinally of the rotor between the opposite ends thereof, these sealing bars 86 being recessed in their opposite ends to receive the packing rings 78 and projecting outwardly of the peripheral surface of the rotor somewhat in the manner of gear teeth.

The valve 50 is provided in its peripheral surface with longitudinally extending grooves of T cross sectional shape extending longitudinally of the valve at locations angularly spaced apart therearound and sealing bars 87 are mounted, one in each of the valve grooves 88 and extend between the opposite ends of the valve. These sealing bars 87 project outwardly of the peripheral surface of the valve somewhat in the manner of gear teeth and slidably engage the inner surface of the recess 18 in the annular wall 11 of the engine housing and intermesh with the bars 86 on the rotor 20 to provide a fluidtight seal between the periphery of the valve 50 and the periphery of the rotor 20.

The valve 51 is provided, in its peripheral surface, with grooves of T cross sectional shape corresponding to the grooves 88 in the valve 50, and sealing bars 89 are mounted, one in each of the grooves in the valve 51 and project outwardly of the peripheral surface of this valve and extend longitudinally thereof from one end to the other, slidably engaging at their outer ends the inner surface of the recess 19 in the annular wall 11 of the engine housing and intermeshing with the bars 86 on the rotor 20 to provide a fluidtight seal between the valve 51 and the rotor.

A slot 90 extends longitudinally of the annular wall 11 adjacent the forward side of the valve recess 18 in the direction of rotation of the rotor 20 and an exhaust stack 91 surrounds this slot 90 and projects radially outwardly of the adjacent portion of the annular wall. An intake slot 92 extends through and longitudinally of the annular wall 11 at the rear side of the recess 18 in the direction of rotation of the rotor 20 and an intake stack or pipe 93 surrounds the slot 92 and projects radially outwardly of the adjacent portion of the annular wall 11.

A dome shaped member 95 has its open end disposed against the outer side of the end wall 15 of the engine housing and extends over the closed bearing receptacle 60 at the corresponding end of the valve 51 in overlying relationship to the adjacent end of the valve. This member 95 is provided around its open end with an outwardly extending, annular flange 96 provided with apertures at angularly spaced apart locations therearound and bolts 97 extending through the apertures in the flange 96 and registering apertures in the end wall 15 firmly secure the member 95 in position on the end wall 15 of the engine housing. The member 95 is provided with heat dissipating fins 98 on its outer surface and with an outwardly projecting boss 99 having a bore 100 extending therethrough from the outer end of the boss into the ignition chamber 101 provided between the inner surface of the member 95 and the portion of the outer surface of the end wall 15 within this member.

A fuel injector 102 of known construction is mounted in the bore of the boss 99 and is effective to inject fuel into the combustion chamber 101 in timed relationship to the rotation of the rotor 20, and a second boss 103 projects outwardly from the member 95 and is provided with a bore in which is mounted a heating or glow plug 104 of known construction and of the type commonly used to facilitate combustion in compression ignition internal combustion engines.

A slot 105 of arcuate shape longitudinally is provided in the end wall 15 extending partly around the upper portion of the bearing receptacle formation 60 and this slot is so positioned and so dimensioned that a portion thereof is uncovered by the adjacent end of the recess 75 in the valve 51 as a piston approaches this valve, so that air compressed in the annular chamber 106 between the periphery of the rotor 20 and the inner surface of the annular wall 11 by the piston as it approaches the valve 50 will be forced through the recess 75 and the slot 105 into the ignition chamber 101. As the piston starts past the valve 51 through the recess 75, the recess moves away from the slot 105 which is now closed by the end of the valve and the compressed air is held, during this time, in the ignition chamber 101. The ignition chamber is so restricted in size that the air compressed therein is raised in temperature to the ignition temperature of the engine fuel and, while the air is thus held in the ignition chamber, fuel is injected into the ignition chamber by the fuel injector 102 and begins to burn in the ignition chamber, raising the pressure of the fluid in this chamber.

As soon as the piston has passed the valve 51, the adjacent end of the valve recess 75 again moves into registry with a portion of the slot 105, the recess being now disposed at the side of the valve adjacent the retreating piston, and the burning charge from the ignition chamber 101 now flows into the annular chamber between the valve 51 and the piston moving away from this valve delivering a power stroke to the piston.

A boss 108 projects outwardly from the annular wall 11 adjacent the rear side of the recess 19 in the direction of rotor travel and this boss has a bore 109 extending therethrough from the outer end of the boss to the annular chamber 106 and a fuel injector 110 is mounted in the boss 108 and is effective to inject additional fuel into the combustion charges in the annular chamber after the charge has been delivered from the ignition chamber 101 into the annular chamber 106 between the valve 51 and the piston which has passed the valve. Fuel pumps 112 and 113 are mounted on the end wall 15 of the housing adjacent the bearing receptacle formation 53 by brackets 114 and 115 respectively, and have cam followers 116 and 117 engaged by cams 118 on the projecting end of the valve shaft 52. The pump 113 is connected by a tube 120 to the injector 102 and the pump 112 is connected by a tube or conduit 121 to the injector 110, the pumps 112 and 113 being connected to a fuel tank or reservoir by the tubes or conduits 123 and 124 respectively.

An arcuately curved slot 130 is provided in the back end wall 16 of the engine within the sealing ring 19 at the corresponding end of rotary valve 51 and extends partly around the bearing boss 61. The slot 130 is rotationally spaced approximately 180° from the slot 105 and is effective to discharge gas under pressure from the recess 75 in the valve 51 at times when the slot 105 is closed by the valve. This arrangement improves the scavenging of the engine since it discharges the compressed gas carried in the valve recess from the expansion portion of the engine, so that this gas does not interfere with the fresh air intake.

In the operation of the engine, after a piston passes the intake slot 92, it draws air through this slot into the annular passage 106 and, as the next succeeding piston passes the intake slot, it compresses this air between itself and the valve 51 and, as the rotation of the valve registers the valve recess with the arcuate slot 103 in the end wall 15, compresses the charge of air into the ignition chamber 101. As the piston is passing the valve 51, the slot 103 is closed by the valve and fuel is injected through the fuel injector 102 into the ignition chamber, the temperature of the compressed air in this chamber being sufficiently high to ignite the fuel. After the piston passes the valve 51, the valve reopens the slot 103, but now into the space between the valve and the piston after the piston has passed the valve and the burning charge passes from the ignition chamber 101 into the annular chamber 106 between the valve 51 and the piston, giving a power stroke to the piston. A predetermined amount of additional fuel is then injected into the burning charges through the fuel injector 110 to maintain the gas pressure against the piston as the piston passes around the annular chamber to the exhaust slot 90. As soon as the piston passes the exhaust slot, the combustion gases are released through this slot and the next succeeding piston, compressing these gases between itself and the valve 50, drives all of the exhaust gases out of the engine housing. After passing the valve 50 and the intake passage or slot 92, the piston draws a fresh charge of intake air into the engine. Each piston thus delivers one power stroke for each rotation of the engine and, where there are two pistons, as in the engine illustrated, there will be two power strokes for each rotor rotation. There will also be a free and complete charging of the engine with fresh air after each power stroke and complete scavenging of exhaust gas from the engine, so that the power of the engine is not reduced by the mixing of exhaust gases with the intake air.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a rotary internal combustion engine including a housing having flat end walls disposed in spaced apart and substantially parallel relationship, and an annular wall disposed between said end walls marginally thereof and provided internally with recesses of partly cylindrical shape extending longitudinally thereof at locations angularly spaced apart therearound, a rotor of substantially cylindrical shape disposed between and journaled on said end wall centrally thereof and providing an annular chamber between its peripheral surface and said annular housing wall, pistons projecting from the peripheral surface of said rotor across said annular chamber at locations angularly spaced apart around said rotor and movable around said annular chamber, valves of substantially cylindrical shape disposed one in each of said recess and journaled in said end walls and each having therein a longitudinally extending recess effective to pass said pistons by said valves as said rotor rotates in said housing, and means drivingly connecting said rotor to said valves for timed rotation of said valves relative to the rotation of said rotor, the sealing arrangement wherein said rotor has circular grooves one in each end thereof extending around said rotor adjacent the peripheral surface thereof, said end walls having in their inner surfaces circular grooves registering with the grooves in the corresponding ends of said rotor, circular sealing rings are disposed one in each rotor groove and extend into the corresponding grooves in said end walls, and corrugated springs are disposed between said rings and the bottom surfaces of said rotor grooves resiliently urging said sealing rings outwardly of the rotor grooves and into the corresponding end wall grooves, and each valve is provided in each end thereof with a partly circular groove extending around the valve end adjacent the peripheral surface of the valve between the opposite sides of the corresponding valve recess, said end walls are provided in their inner surfaces with circular grooves registering respectively with the grooves in the ends of said valves, sealing rings of partly circular circumferential shape are disposed one in each valve end groove and extend into the corresponding end wall grooves, and corrugated springs are disposed one between each partly circular sealing ring and the bottom surface of the corresponding valve groove and resiliently urge said partly circular sealing rings outwardly of the corresponding valve grooves and into the corresponding end wall grooves.

2. In a rotary internal combustion engine including a housing having flat end walls disposed in spaced apart and substantially parallel relationship and an annular wall disposed between said end walls marginally thereof and provided internally with recesses of partly cylindrical shape extending longitudinally thereof at locations angularly spaced apart therearound, a rotor of substantially cylindrical shape disposed between and journaled on said end walls centrally thereof and providing an annular chamber between its peripheral surface and said annular housing wall, pistons projecting from the peripheral surface of said rotor across said annular chamber at locations angularly spaced apart around said rotor and movable around said annular chamber, valves of substantially cylindrical shape disposed one in each of said recesses and journaled in said end walls and each having therein a longitudinally extending recess effective to pass said pistons by said valves as said rotor rotates in said housing, and means drivingly connecting said rotor to said valves for timed rotation of said valves relative to the rotation of said rotor, the sealing arrangement wherein said rotor is provided in its peripheral surface with undercut grooves extending longitudinally of said rotor at closely spaced locations therearound, flanged sealing bars are mounted one in each groove and project radially of the peripheral surface of said rotor, each of said valves is provided in its peripheral surface with undercut grooves extending longitudinally of said valves at closely spaced locations therearound, and flanged sealing bars are mounted one in each valve groove and project radially from the peripheral surfaces of said valves into engagement with the surfaces of the corresponding housing recesses and intermesh with the sealing bars on said rotor.

3. In a rotary internal combustion engine including a housing having flat end walls disposed in spaced apart and substantially parallel relationship and an annular wall disposed between said end walls marginally thereof and provided internally with recesses of partly cylindrical shape extending longitudinally thereof at locations angularly spaced apart therearound, a rotor of substantially cylindrical shape disposed between and journaled on said end walls centrally thereof and providing an annular chamber between its peripheral surface and said annular housing wall, pistons projecting from the peripheral surface of said rotor across said annular chamber at locations angularly spaced apart around said rotor and movable around said annular chamber, valves of substantially cylindrical shape disposed one in each of said recesses and journaled in said end walls and each having therein a longitudinally extending recess effective to pass said pistons by said valves as said rotor rotates in said housing, and means drivingly connecting said rotor to said valves for timed rotation of said valves relative to the rotation of said rotor, the sealing arrangement wherein said rotor is provided in its peripheral surface with undercut grooves extending longitudinally of said rotor at closely spaced locations thereneath, flanged sealing bars are mounted one in each groove and project radially of the peripheral surface of said rotor, each of said valves is provided in its peripheral surface with undercut grooves extending longitudinally of said valves at closely spaced locations therearound, and flanged sealing bars are mounted one in each valve groove and project radially from the peripheral surfaces of said valves into engagement with the surfaces of the corresponding housing recesses and intermesh with the sealing bars on said rotor, and corrugated springs are disposed one between each sealing bar and the bottom surface of the corresponding groove resiliently urging said bars outwardly of said grooves.

4. In a rotary internal combustion engine including a housing having flat end walls disposed in spaced apart and substantially parallel relationship and an annular wall disposed between said end walls marginally thereof and provided internally with recesses of partly cylindrical shape extending longitudinally thereof at locations angularly spaced apart therearound, a rotor of substantially cylindrical shape disposed between and journaled on said end wall centrally thereof and providing an annular chamber between its peripheral surface and said annular housing wall, pistons projecting from the peripheral surface of said rotor across said angular chamber at locations angularly spaced apart around said rotor and movable around said annular chamber, valves of substantially cylindrical shape disposed one in each of said recesses and journaled in said end walls and each having therein a longitudinally extending recess effective to pass said pistons by said valves as said rotor rotates in said housing, and means drivingly connecting said rotor to said valves for timed rotation of said valves relative to the rotation of said rotor, the sealing arrangement wherein said rotor has circular grooves one in each end thereof extending around said rotor adjacent the peripheral surface thereof, said end walls having in their inner surfaces circular grooves registering with the grooves in the corresponding ends of said rotor, circular sealing rings are disposed one in each rotor groove and extend into the corresponding grooves in said end walls, and corrugated springs are disposed between said rings and the bottom surfaces of said rotor grooves resiliently urging said sealing rings outwardly of the rotor grooves and into the corresponding end wall grooves, and each valve is provided in each end thereof with a partly circular groove extending around the valve end adjacent the peripheral surface of the valve between the opposite sides of the corresponding valve recess, said end walls are provided in their inner surfaces with circular grooves registering respectively with the grooves in the ends of said valves, sealing rings of partly circular circumferential shape are disposed one in each valve end groove and extend into the corresponding end wall grooves, and corrugated springs are disposed one between each partly circular sealing ring and the bottom surface of the corresponding valve groove and resiliently urge said partly circular sealing rings outwardly of the corresponding valve grooves and into the corresponding end wall grooves, and wherein said rotor is provided in its peripheral surface with undercut grooves extending longitudinally of said rotor at closely spaced locations therearound, flanged sealing bars are mounted one in each groove and extend between the corrsponding sealing rings and project radially of the peripheral surface of said rotor, each of said valves is provided in its peripheral surface with undercut grooves extending longitudinally of said valves at closely spaced locations therearound, and flanged sealing bars are mounted one in each valve groove and project radially from the peripheral surface of said valves into engagement with the surfaces of the corresponding housing recesses and extend between the corresponding partly circular sealing rings and intermesh with the sealing bars on said rotor.

5. In a rotary internal combustion engine including a housing having flat end walls disposed in spaced apart and substantially parallel relationship and an annular wall disposed between said end walls marginally thereof and provided internally with recesses of partly cylindrical shape extending longitudinally thereof at locations angularly spaced apart therearound, a rotor of substantially cylindrical shape disposed between and journaled on said end walls centrally thereof and providing an annular chamber between its peripheral surface and said annular housing wall, pistons projecting from the peripheral surface of said rotor across said annular chamber at locations angularly spaced apart around said rotor and movable around said annular chamber, valves of substantially cylindrical shape disposed one in each of said recesses and journaled in said end walls and each having therein a longitudinally extending recess effective to pass said pistons by said valves as said rotor rotates in said housing, and means drivingly connecting said rotor to said valves for timed rotation of said valves relative to the rotation of said rotor, the sealing arrangement wherein said rotor is provided in its peripheral surface with undercut grooves extending longitudinally of said rotor at closely spaced locations therearound, flanged sealing bars are mounted one in each groove and project radially of the peripheral surface of said rotor, each of said valves is provided in its peripheral surface with undercut grooves extending longitudinally of said valves at closely spaced locations therearound, and flanged sealing bars are mounted one in each valve groove and project radially from the peripheral surfaces of said valves into engagement with the surfaces of the corresponding housing recesses and intermesh with the sealing bars on said rotor, and corrugated springs are disposed one between each sealing bar and the bottom surface of the corresponding groove resiliently urging said said bars outwardly of said grooves, and wherein each of said pistons has an undercut groove extending longitudinally of the outer surface thereof and undercut grooves extending one across each end thereof radially of said rotor, flanged sealing bars are mounted one in each piston groove with the bars in said end grooves overlapping at their outer ends the corresponding ends of the bars mounted in said longitudinally extending grooves, and corrugated springs are disposed one between each piston carried bar and the bottom surface of the corresponding groove resiliently urging the piston carried sealing bars outwardly of the corresponding grooves and into engagement with the corresponding surfaces of said annular chamber.

References Cited in the file of this patent
UNITED STATES PATENTS

| | | |
|---|---|---|
| 175,659 | Button | Apr. 4, 1876 |
| 345,875 | Belt | July 20, 1886 |
| 637,986 | Darragh | Nov. 28, 1899 |
| 664,480 | Ibach | Dec. 25, 1900 |
| 711,083 | Taylor | Oct. 14, 1902 |
| 953,206 | King | Mar. 29, 1910 |
| 1,098,256 | Harper | May 26, 1914 |
| 1,118,840 | Bjornson | Nov. 24, 1914 |
| 1,239,694 | Jackman et al. | Sept. 11, 1917 |
| 1,688,816 | Kraus | Oct. 23, 1928 |
| 1,720,098 | Schreffler et al. | July 9, 1929 |
| 1,828,207 | Stone | Oct. 20, 1931 |
| 1,845,834 | Faulman | Feb. 16, 1932 |
| 2,018,391 | Whitfield | Oct. 22, 1935 |
| 2,019,650 | Bischof | Nov. 5, 1935 |
| 2,571,642 | Yancy | Oct. 16, 1951 |